United States Patent
Terruzzi et al.

(10) Patent No.: US 10,775,556 B2
(45) Date of Patent: Sep. 15, 2020

(54) OPTICAL FIBRE HAVING A CROSSLINKED SECONDARY COATING

(71) Applicants: PRYSMIAN S.p.A., Milan (IT); POLITECNICO DI MILANO, Milan (IT)

(72) Inventors: Lidia Terruzzi, Milan (IT); Pamela De Martino, Milan (IT); Attilio Citterio, Milan (IT); Massimo Gola, Boffalora Sopra Ticino (IT)

(73) Assignees: PEYSMIAN S.p.A., Milan (IT); POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/572,900

(22) Filed: Sep. 17, 2019

(65) Prior Publication Data

US 2020/0088937 A1 Mar. 19, 2020

(30) Foreign Application Priority Data

Sep. 19, 2018 (IT) .................. 102018000008713

(51) Int. Cl.
| | |
|---|---|
| *G02B 6/02* | (2006.01) |
| *C08G 59/50* | (2006.01) |
| *C09D 163/00* | (2006.01) |
| *C09D 167/08* | (2006.01) |

(52) U.S. Cl.
CPC ..... *G02B 6/02395* (2013.01); *C08G 59/5006* (2013.01); *C09D 163/00* (2013.01); *C09D 167/08* (2013.01)

(58) Field of Classification Search
CPC ............ G02B 6/02395; C08G 59/5006; C08G 59/686; C08G 59/226; C08G 59/4276; C08G 59/245; C08G 59/28; C09D 163/00; C09D 167/08; C09D 167/06; C03C 25/36; C03C 25/323
See application file for complete search history.

(56) References Cited

U.S. PATENT DOCUMENTS

| | | | |
|---|---|---|---|
| 3,066,383 A | 12/1962 | Marzocchi et al. | |
| 8,189,979 B2 * | 5/2012 | Debut ................. | C03C 25/106 385/128 |
| 8,426,021 B2 * | 4/2013 | Cattron ............... | C03C 25/1065 428/378 |
| 8,781,282 B2 * | 7/2014 | Terruzzi ............. | G02B 6/02395 385/128 |
| 10,215,942 B2 * | 2/2019 | Liu ...................... | G02B 6/4402 |
| 2002/0132118 A1 * | 9/2002 | Hirai ................... | C03C 25/1065 428/375 |
| 2008/0241535 A1 | 10/2008 | Cattron et al. | |
| 2012/0003474 A1 | 1/2012 | Cattron et al. | |
| 2013/0237643 A1 | 9/2013 | Cattron et al. | |
| 2014/0106082 A1 | 4/2014 | Cattron et al. | |

FOREIGN PATENT DOCUMENTS

| | | |
|---|---|---|
| CA | 459839 A | 9/1949 |
| CH | 358063 A | 11/1961 |

OTHER PUBLICATIONS

Italian Search report dated Jun. 11, 2019 in Italian Application 201800008713, filed on Sep. 19, 2018 (with English Translation of Categories of Cited Documents & Written Opinion).

* cited by examiner

*Primary Examiner* — John Bedtelyon
(74) *Attorney, Agent, or Firm* — Oblon, McClelland, Maier & Neustadt, L.L.P.

(57) ABSTRACT

An optical fibre comprising: an optical waveguide comprising a glass core surrounded by a glass cladding; a primary coating surrounding the optical waveguide; a secondary coating, surrounding the primary coating, comprising a cured polymer material obtained by curing a curable coating composition comprising: (a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.; (b) an aromatic glycidyl epoxy resin; (c) an aliphatic polyether hardener containing from 8 to 64 hydroxy groups and/or from 2 to 4 epoxy groups; and (d) a secondary amine compound as curing agent. Preferably, the step of curing is a thermal curing, preferably up to 300° C. When cured by heat, the coating material can be applied during the drawing process of the fibre so as to exploit the heat of the just drawn glass fibre as heat source for curing.

16 Claims, No Drawings

OPTICAL FIBRE HAVING A CROSSLINKED SECONDARY COATING

FIELD OF THE DISCLOSURE

The present disclosure relates to an optical fibre having a cured secondary coating obtained from a curable coating composition comprising a polyester and an epoxy resin. The secondary coating can be either radiation cured or, more advantageously, thermally cured. The cured polymeric material has optimal mechanical properties (e.g. E' modulus and Tg onset) for being used as secondary coating in an optical fibre. The coating material of the present disclosure is a valuable alternative to the conventional polymeric materials used as secondary coatings, such as UV-curable acrylate polymer materials, which need to be cured by means of radiation at controlled temperature.

BACKGROUND OF THE DISCLOSURE

Optical fibres commonly comprise a glass core, inside which the transmitted optical signal is confined by the surrounding cladding (typically with a diameter of about 120-130 µm), generally made of glass. The combination of core and cladding is usually identified as "optical waveguide". The optical waveguide is generally protected by a coating, typically of polymeric material, which protects the fibre glass from the external environment and provides resistance to physical handling forces, such as those encountered when the fibre is subjected to cabling operations. The coating typically comprises a first coating layer positioned in direct contact with the cladding, also known as the "primary coating", and at least one second coating layer, also known as "secondary coating", surrounding the first coating. In the art, the combination of primary coating and secondary coating is sometimes also identified as "primary coating system", as both these layers are generally applied during the drawing manufacturing process of the fibre. In this case, the coating in contact with the cladding is called "inner primary coating" while the coating in contact with and surrounding the inner primary coating is called "outer primary coating". In some instance, a single coating can be applied in contact with the cladding. Thereafter, the term "primary coating" shall designate the inner primary coating and the term "secondary coating" shall designate the outer primary coating.

Generally, the primary coating is made of a relatively soft material having a relatively low modulus of elasticity E' at room temperature (typically of from 0.1 MPa to 5 MPa) and a low glass transition temperature (Tg), for example lower than −20° C. The secondary coating is generally formed by a more rigid polymer having a higher modulus of elasticity E' at room temperature (typically of from 500 MPa to 2000 MPa) and a higher Tg compared to those of the primary coating layer.

For certain applications, optical waveguides may be coated with a single coating layer having modulus of elasticity and Tg values which are intermediate between those of the primary coating and the secondary coating. The overall diameter of the optical waveguide with the primary and secondary coating can be of from 150 µm to 250 µm.

The polymer materials generally used to form primary coatings, secondary coatings and single layer coatings are obtained from compositions comprising acrylate oligomers and monomers that are cured by means of UV radiation in the presence of a suitable photoinitiator. The acrylate polymer coatings, however, should be formed on the optical waveguide at relatively low temperatures, e.g. from ambient temperature to about 50° C., and cured in the presence of an inert atmosphere (e.g. under nitrogen gas) in order to avoid the thermal degradation of the polymer materials and guarantee the proper adhesion of the coating layer to the optical waveguide or to the primary coating. These constraints require the use of special apparatuses for controlling the temperature during the polymer deposition and curing process. Typically, radiation curing ovens are continuously flushed with inert gases (e.g. nitrogen or helium) in order to maintain the required conditions.

The need for the above-described stringent operating conditions, apparently, makes the manufacturing process of the optical fibres and the apparatus used for carrying out the process thereof rather complex and costly.

A thermally curable coating for optical fibres is disclosed in WO2018/015790. This patent application describes an optical fibre comprising an optical waveguide surrounded by a coating comprising a cured polymer material comprising a polyester obtained by esterification of: a reactant A selected from an acid, a triglyceride, or a mixture of triglycerides, having a $C_{16}$-$C_{24}$ aliphatic chain comprising at least two conjugated double bonds; and a polyol made of at least one monomer comprising at least 3 hydroxyl groups, the polyol being thermally stable up to 300° C. (reactant B). The mechanical properties of the coating material are especially suitable for use as primary or single coating.

SUMMARY OF THE DISCLOSURE

The Applicant has faced the problem of providing a polymer material suitable for forming secondary coating layers on optical fibres that can be cured at a relatively high temperature, either thermally or by radiation, in order to simplify the manufacturing process of coated optical waveguides.

In particular, the Applicant has faced the problem of providing a polymer material suitable for forming secondary coating layers on optical waveguides which is thermocurable, so that it could be applied to the optical waveguide without using radiation devices, such as UV ovens, which require precise temperature control and the presence of inert gas.

The Applicant has found that the above problems and others that will appear more clearly from the following description can be solved by a polymer material which contain a mixture of certain polyesters and epoxy resins along with at least one hardening agent, which can be cured either by heat or by radiation.

When cured by heat, the polymer material of the present disclosure has the advantage of being applicable during the drawing process of the fibre before the drawn fibre is cooled down close to room temperature, and of exploiting the heat of the just drawn glass fibre as heat source for curing.

When cured by radiation, the polymer material of the present disclosure has the advantage of allowing the use of less controlled operating conditions, particularly during the curing step, because these polymers have less sensitivity to thermal degradation even when cured in the presence of oxygen.

The cured polymer material of the present disclosure has mechanical properties, in particular elasticity and glass-transition temperature (Tg), which make it particularly suitable for use as secondary coating. The optical fibre having a secondary coating made of the polymer material of the present disclosure is suitable for use over a wide range of temperatures (e.g. from −60° C. to +300° C.).

According to a first aspect, therefore, the present disclosure relates to an optical fibre comprising:
- an optical waveguide comprising a glass core surrounded by a glass cladding;
- a primary coating surrounding the optical waveguide;
- a secondary coating, surrounding the primary coating, comprising a cured polymer material obtained by curing a curable coating composition comprising:
  (a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
  (b) an aromatic glycidyl epoxy resin;
  (c) an aliphatic polyether hardener containing from 8 to 64 hydroxy groups and/or from 2 to 4 epoxy groups; and
  (d) a secondary amine compound as curing agent.

In an embodiment, the present disclosure relates to an optical fibre comprising a secondary coating comprising a cured polymer material obtained by curing a curable coating composition comprising:
  (a) from 15 to 35 wt % of a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
  (b) from 60 to 83 wt % of an aromatic glycidyl epoxy resin;
  (c) from 0.1 to 1 wt % of an aliphatic polyether hardener containing from 8 to 64 hydroxy groups and/or from 2 to 4 epoxy groups; and
  (d) from 0.3 to 1.5 wt % a secondary amine compound as curing agent,
the wt % being calculated with respect to the total weight of the curable coating composition.

In an embodiment, the curing of the curable coating composition is carried out thermally, for example, at a temperature up to 300° C. or at a temperature within the range 80° C. to 300° C.

In an alternative embodiment, the curing of the curable coating composition can be carried out by radiation, for example by UV radiation.

According to a second aspect, the present disclosure relates to a process for coating an optical fibre comprising:
- providing an optical waveguide comprising a glass core surrounded by a glass cladding;
- forming a primary coating on the cladding;
- applying a curable coating composition on the primary coating, said curable coating composition comprising:
  (a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
  (b) an aromatic glycidyl epoxy resin;
  (c) an aliphatic polyether hardener containing from 8 to 64 hydroxy groups and/or from 2 to 4 epoxy groups; and
  (d) a secondary amine compound as curing agent
curing said curable coating composition so as to form a secondary coating comprising a cured polymer material.

In an embodiment, the curing of the curable coating composition is carried out thermally, for example, at a temperature up to 300° C. or at a temperature within the range 80° C. to 300° C.

In an alternative embodiment, the curing of the curable coating composition can be carried out by radiation, for example by UV radiation.

According to a third aspect, the present disclosure relates to a curable coating composition comprising:
  (a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
  (b) an aromatic glycidyl epoxy resin;
  (c) an aliphatic polyether hardener containing from 8 to 64 hydroxy groups and/or from 2 to 4 epoxy groups; and
  (d) a secondary amine compound as curing agent.

For the purpose of the present description and of the appended claims, as "aliphatic chain comprising at least two double bonds spaced by one carbon atom at most" it is meant an aliphatic chain wherein two double bonds are spaced by no carbon atom—thus the two double bonds are conjugated—or by one carbon atom which can be a methylene bridge (—$CH_2$—).

For the purpose of the present description and of the appended claims, the words "a" or "an" are used to describe elements and components of the disclosure. This is done merely for convenience and to give a general sense of the disclosure. This description and claims should be read to include one or at least one and the singular also includes the plural unless it is obvious that it is meant otherwise.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the claims that follow, as "thermally stable up to 300° C." is meant that a substance heated up to 300° C., at atmospheric pressure and in air, has a weight loss from 0 wt % to 2 wt % of its weight. The weight loss can be calculated for example by thermogravimetric analysis (TGA; 20° C./min).

For the purpose of the present description and of the appended claims, the values of modulus of elasticity E' and Tg are meant to be determined by means of Dynamic Mechanical Thermal Analysis (DMTA) in tension. Tg is derived from the DMTA curve obtained by on-set point method.

For the purpose of the present description and of the appended claims, the value of number average molecular weight Mn of a polymer is meant to be determined by GPC analysis.

DETAILED DESCRIPTION OF THE DISCLOSURE

According to the disclosure, a suitable reactant A for the preparation of the polyester (a) of the curable coating composition is a carboxylic acid, a triglyceride, or a mixture thereof, having a $C_{16}$-$C_{24}$ aliphatic chain comprising at least two double bonds spaced by one carbon atom at most. The Applicant has observed that a reactant A which does not have chains with at least two double bonds spaced by one carbon atom at most is unsuitable for the purpose of the present disclosure, as the polyester derived by its esterification with a polyol as the reactant (B) is either not sufficiently crosslinkable or is crosslinkable only after curing times too long for a convenient industrial application.

For example, the carboxylic acid having a $C_{16}$-$C_{24}$ aliphatic chain comprising at least two double bonds spaced by one carbon atom at most as reactant A is a monocarboxylic acid.

For example, the carboxylic acid having a $C_{16}$-$C_{24}$ aliphatic chain comprising at least two double bonds spaced by one carbon atom at most as reactant A can be linoleic acid, linolelaidic acid (a.k.a. (9E,12E)-octadeca-9,12-dienoic acid), alpha-linolenic acid, arachidonic acid, eicosapentaenoic acid, alpha-eleostearic acid (α-ESA; 9Z11E13E-18:3), calendic acid (8E10E12Z-18:3), punicic acid (9E11E13Z-18:3) or licanic acid (4-keto-octadeca-9,11,13-trienoic acid).

In an embodiment of the disclosure, the reactant A is a triglyceride or a mixture of triglycerides comprising at least one $C_{16}$-$C_{24}$ aliphatic chain comprising at least two double bonds spaced by one carbon atom at most. Vegetable oils or seed oils can contain such triglycerides or mixture of triglycerides in an amount of from 30 wt % to 80 wt %.

In an embodiment, the reactant A is a mixture of triglycerides containing at least 70% by weight, based on the total weight of said mixture, of at least one $C_{16}$-$C_{24}$ aliphatic chain comprising at least two double bonds spaced by one carbon atom at most. When the amount of $C_{16}$-$C_{24}$ aliphatic chains comprising at least two double bonds spaced by one carbon atom at most in an oil is lower than 70 wt %, known techniques can be applied to concentrate the polyunsaturated part, e.g. fractional crystallization.

Mixture of triglycerides having the above amount of $C_{16}$-$C_{24}$ aliphatic chains comprising at least two double bonds spaced by one carbon atom at most are commercially available, e.g. as tung oil, pomegranate seed oil, calendula oil, and their mixtures.

The use of a triglyceride or a mixture thereof as reactant A can be advantageous with respect to the use of a carboxylic acid, since triglycerides are usually more readily available and less expensive that the corresponding carboxylic acids.

The reactant B, which is a polyol having at least 3 hydroxyl groups, the polyol being thermally stable up to 300° C., is, for example a polyol having from 3 to 9 or from 3 to 6 hydroxyl groups.

The hydroxyl groups of the polyol can be primary, secondary or tertiary hydroxyl groups. In an embodiment, the hydroxyl groups are primary or secondary hydroxyl groups. In another embodiment, the hydroxyl groups are primary hydroxyl groups. Primary hydroxyl groups show the highest reactivity among the three kinds of hydroxyl groups. Thermally stable polyols are known in the art.

Examples of reactant B according to the disclosure are glycerol ethoxylate, glycerol propoxylate, trimethylolpropane ethoxylate, dipentaerythritol, and mixtures thereof.

In an embodiment, glycerol ethoxylate and glycerol propoxylate have an average number molecular weight (Mn) of from 800 to 1,200 (determined by GPC analysis).

In an embodiment, trimethylolpropane ethoxylate has an average number molecular weight (Mn) of from 100 to 1,200.

In an embodiment, the reactant B suitable for the preparation of the polyester (a) of the curable coating composition is in liquid form at room temperature. The liquid form of the reactant B promotes the physical admixture with the reactant A and helps to obtain of a polyester with a homogeneous appearance.

The polyol as reactant B of the disclosure is thermally stable up to 300° C. The polyol as reactant B of the disclosure can be thermally stable even at temperatures over the given limit, but its stability within the above-mentioned limit is to be present.

To prepare the polyesters of the disclosure, reactants A and B are reacted under esterification conditions.

In an embodiment, when reactant A is a carboxylic acid with a $C_{16}$-$C_{24}$ aliphatic chain comprising at least two double bonds spaced by one carbon atom at most, the ratio between reactant A and reactant B is of one mole of reactant A per each hydroxyl group contained in the reactant B.

The number of hydroxyl group contained in reactant B can be determined by known methods for measuring the content of free hydroxyl groups in a chemical substance, which are usually based on the number of milligrams of potassium hydroxide required to neutralize the acetic acid taken up on acetylation of one gram of a chemical substance that contains free hydroxyl groups.

When reactant A is a triglyceride, or a mixture of triglycerides, having a $C_{16}$-$C_{24}$ aliphatic chain comprising at least two double bonds spaced by one carbon atom at most, the esterification between reactants A and B to prepare the polyesters (a) of the disclosure is a transesterification reaction. The reaction conditions are substantially the same employed for the esterification reaction between reactants A and B, when the first is a carboxylic acid.

In an embodiment, when reactant A is a triglyceride, or a mixture of triglycerides, having at least one $C_{16}$-$C_{24}$ aliphatic chain comprising at least two double bonds spaced by one carbon atom at most, the reactant A is made to react with reactant B in a molar ratio a/b within the range from 1:1 to 1:3, wherein a is expressed as number of moles of triglycerides having at least one chain comprising at least two double bonds spaced by one carbon atom at most and b is expressed as number of moles of polyol.

The esterification reaction can be carried out using the techniques and the devices well known to the person skilled in the art. For example, the esterification reaction between the reactant A and the reactant B is carried out in the presence of a catalyst, such as an acid or a base, for example a base, suitable for the esterification of carboxylic acids or triglycerides with polyols. Examples of catalysts are: metal hydroxides, alkoxides and carbonates, alkaline tert-butoxide, rare earth oxides, rare earth salts and transition metal salts, organometallics, amines, guanidines and the like.

In an embodiment, the catalyst of the esterification reaction to obtain the polyester (a) is in liquid form at room temperature.

In an embodiment, the catalyst of the esterification reaction to obtain the polyester (a) is a tin or a titanium catalyst. Examples of suitable catalyst according to the disclosure are: organotin oxides, hydroxides, and alkoxides (such as dibutyltin oxide, dibutyltin laurate, dibutyltin dilaurate), titanium tetraisopropoxide and mixtures thereof.

In an embodiment, the esterification catalyst is used in an amount within the range of from 0.1 to 3 mol %, based on the total moles of the carboxylic acid present in the reaction mixture, when the carboxylic acid is used as such, or from 0.1 to 0.8 mol % of triglycerides present in the reaction mixture.

The esterification reaction can be carried out at a temperature within the range from 50° C. to 250° C., for example.

In an embodiment, the esterification reaction is carried out at a pressure within the range from 1 atm to 4 atm.

In an embodiment, the esterification reaction time is within the range from 2 hours to 48 hours.

In an embodiment, the esterification reaction is carried out in the absence of any added solvent so as to avoid any contamination of the polymer coating applied on the optical waveguide.

As said above, the polyester (a) of the present disclosure can be present in an amount of from 15 to 35 wt % with respect to the total weight of the curable composition, for example from 20 to 35 wt %. The amount from 15 to 35 wt % substantially corresponds to 5-15 mol % (calculated with respect to the total number of moles of triglyceride chains) with respect to the total mole amount of the curable composition.

The aromatic glycidyl epoxy resin (b) can be an aromatic glycidyl ether resin, i.e. a resin comprising two or more aromatic glycidyl ether groups, or an aromatic glycidyl amine resin, i.e. a resin comprising two or more aromatic glycidyl amine groups.

In an embodiment, the coating composition comprises an aromatic glycidyl ether resin and an aromatic glycidyl amine resin. In an embodiment, the weight ratio between the aromatic glycidyl ether resin and the aromatic glycidyl amine resin is within the range from 10:1 to 1:1, for example from 7:1 to 2:1.

Aromatic glycidyl epoxy resins (b) suitable for use in the curable coating composition are known to the person skilled in the art and available on the market. For example, the aromatic glycidyl epoxy resin (b) is selected from: poly(bisphenol A-co-epichlorohydrin) glycidyl end-capped; 4,4'-methylenebis(N,N-diglycidyl-aniline); and mixtures thereof. The poly(bisphenol A-co-epichlorohydrin) glycidyl end-capped can have a number average molecular weight (Mn) within the range from 200 to 1100.

As said above, the aromatic glycidyl epoxy resin (b) of the present disclosure can be present in an amount of from 60 to 83 wt % with respect to the total weight of the curable composition. Such amount range substantially corresponds to 78-83 mol % with respect to the total mole amount of the curable composition.

Aromatic glycidyl epoxy resin (b) can be prepared, for example, by polycondensation of epichlorohydrin and compounds containing active hydrogen atoms, such as phenols (e.g. bis-phenol A), alcohols, organic acids and amines.

The curable coating composition according to the present disclosure comprises also a hardening agent (c) capable of reacting with aromatic glycidyl epoxy resins to form three-dimensional cross-linked thermoset structures (curing).

Without wishing to be bound to any theory, it is believed that the hardener's molecules—which are relatively more rigid than the polyester and aromatic glycidyl epoxy resins—bind to the chains of the polyester (a) and/or the aromatic glycidyl epoxy resins connecting them and creating a rigid framework. The rigidity of resulting structure can be mathematically defined, for example, using a rigidity matroid as well known to the skilled expert.

According to the present disclosure, the hardening agent (c) is an aliphatic polyether hardener containing from 10 to 20 hydroxy groups and/or from 2 to 4 epoxy groups.

In an embodiment, the aliphatic polyether hardener is an aliphatic dendritic polyol polymer. A suitable dendritic polyol polymer is a hyperbranched bis-MPA polyester having from 8 to 64 hydroxy group, for example from 10 to 24, which is obtainable from the polymerization of 2,2-bis(methylol)propionic acid (bis-MPA) with trimethylolpropane.

In another embodiment, the aliphatic polyether hardener is a polyethyleneglycol diglycidyl ether.

In an embodiment, the polyethyleneglycol diglycidyl ether has a number molecular weight (Mn) within the range from 200 to 1.500.

Both the polyethyleneglycol diglycidyl ether and the dendritic polyol polymers that are suitable for use in the present disclosure are known to the person skilled in the art and available in the market.

As said above, the aliphatic polyether hardener (c) of the present disclosure can be present in an amount of from 0.1 to 1 wt %, for example from 0.1 to 0.8 wt %, with respect to the total weight of the curable composition. The amount from 0.1 to 1 wt % substantially corresponds to 0.02-2 mol % with respect to the total mole amount of the curable composition.

In an embodiment, the secondary amine compound (d) as curing agent according to the present disclosure is an aliphatic amine compound. Examples of secondary amine compound as curing agent are: piperidine, hexamethylene-diamine, triethyl-enetetramine, butylamine.

As said above, the secondary amine compound (d) of the present disclosure can be present in an amount of from 0.3 to 1.5 wt %, for example from 0.1 to 1.3 wt %, with respect to the total weight of the curable composition. The amount from from 0.3 to 1.5 wt % substantially corresponds to 1-6 mol % with respect to the total mole amount of the curable composition.

In an embodiment, the curable coating composition of the present disclosure is thermally cured. Thermal curing can be carried out by applying thermal radiation (e.g. infrared radiation) or by heat transfer (e.g. heat transfer from a heated fluid, for instance hot air). Thermal curing can be carried out at a temperature up to 300° C., for example within the range of 80° C. to 300° C. or within the range of 120° C. to 300° C.

In an alternative embodiment, the curable coating composition of the present disclosure may be radiation cured, e.g. by applying ultraviolet radiation, X-rays, electron beams, and the like. According to another possible embodiment, the curable coating composition of the present disclosure may be cured by thermal curing combined with radiation curing.

The curing of the curable coating composition can take place also in the presence of oxygen. Oxygen can have a role as crosslinking initiator or adjuster. The desired final properties of the cured polymer material can be adjusted also by varying both the curing temperature and the curing time, as these two parameters can influence the crosslinking density of the curing reaction and thus the degree of crosslinking of the polymer material.

In an embodiment, the curing of the curable coating composition can be carried out in the presence of a thermal free-radical initiator. A cationic initiator can be concurrently employed.

For example, thermal initiators having an activation temperature within the range of from 60° C. to 300° C. are used. Examples of thermal initiators that can be used for the purpose of the present disclosure are: 2,2'-azobis(2-methyl-propio-nitrile), meso-1,2-dibromo-1,2-diphenyl ethane, tretraalkyl-1,2-diphenylethanes.

Examples of cationic initiators that can be used for the purpose of the present disclosure are iodonium derivatives.

When a thermal initiator is used, a thermocurable coating composition comprising a polyester (a), an aromatic glycidyl epoxy resin (b), an aliphatic polyether hardener (c) and a thermal initiator is prepared, wherein said initiator can be present in an amount of from 0.1 phr to 5 phr, for example from 1 phr to 4 phr.

According to another embodiment, the cured polymer material of the coating is obtained by UV-curing the curable coating composition of the present disclosure, for example in the presence of a photoinitiator. Conventional photoinitiators can be used in the present disclosure. Examples of suitable photoinitiators include benzophenone and/or acetophenone derivatives, such as alpha-hydroxy alkylphenyl ketones, benzoin alkyl ethers and benzyl ketals, monoacylphosphine oxides, and bisacylphosphine oxides.

When a photoinitiator is used, a UV-curable composition comprising a polyester, an aromatic glycidyl epoxy resin, an aliphatic polyether hardener and a photoinitiator can be prepared, wherein said photoinitiator can be present in an amount of 0.5 wt % to 5 wt % with respect to the total weight of the curable composition.

The curable coating compositions of the present disclosure can also include other conventional additives in effective amounts. For example, additives such as stabilizers, levelling agents, adhesion promoters, chain transfer agents, colorants including pigments and dyes, viscosity adjusters, wettability adjusters, and the like can be used.

The curable composition of the present disclosure can be prepared by mixing the components with any suitable method known in the art. For example, the solid component/s of the mixture, if any, is/are first dissolved or dispersed in the less viscous of the liquid component.

After curing, the polymers obtained have mechanical properties, elasticity and adhesion properties which make them suitable as coating layers for optical fibres. Particularly, the cured polymer materials of the present disclosure have modulus of elasticity E' and glass transition temperature Tg which fulfil the requirements for use as secondary coating layer.

When used as secondary coating layer, the cured polymer material of the present disclosure can have a modulus of elasticity (E') at 25° C. of from 500 to 2000 MPa, and a glass transition temperature (Tg) of at least 35° C.

In accordance with the present disclosure, the primary coating can be made of the polymeric materials conventionally used for the manufacturing of primary protective coatings for optical fibres, for example UV-curable acrylate primary coatings. For example, the primary coating is made of a cured polymer material based on a polyester of the type used as ingredient (a) of the curable coating composition, in the absence of aromatic glycidyl epoxy resins, aliphatic polyether hardener and secondary amine compound catalyst. For example, the primary coating may be made for example with the thermally curable polymer material described in WO2018/015790. Another material suitable for the primary coating of the optical fibre of the disclosure is described in WO 03/091177, in WO2017/103655 or marketed for example by DSM. For example, the elastic modulus of the primary coating at ambient temperature (25° C.) is within the range 0.1-5 MPa.

The manufacturing of the coated optical fibre according to the present disclosure can be carried out according to known techniques. For example, after drawing of the optical waveguide and application of the primary coating, a secondary coating can be applied on the primary coating by passing the optical waveguide coated with the primary coating through a sizing die and a reservoir containing the curable composition according to the present disclosure.

When a thermally curable composition is used, the application can advantageously be done when the optical waveguide has a suitable temperature, e.g. from 150° C. to 300° C., so as to exploit the heat of the drawn optical waveguide to obtain the final cured polymer material. When a radiation curable polymer or composition is applied, the application step is followed by radiation curing (e.g. by UV or IR) of the applied composition so as to obtain the final polymer material. In the case of deposition of both a primary and a secondary coating, the latter is applied on the primary coating before or after the curing of the primary coating (by techniques known as wet-on-dry or wet-on-wet deposition).

An optical fibre thus produced may be used in the production of optical cables. The fibre may be used either as such or in the form of ribbons comprising several fibres combined together by means of a common coating.

The present description shows some embodiments of a coated optical fibre according to the disclosure. Suitable modifications can be made to these embodiments according to specific technical needs and application requirements without departing from the scope of the disclosure.

The present disclosure will become fully clear after reading the following example showing the curing behaviour of some coatings of the disclosure.

Examples

A polyester according to the present disclosure was prepared using the following procedure.

A reaction mixture was prepared by mixing at ambient temperature (25° C.) a triglyceride, a polyol and an esterification catalyst.

The triglyceride was tung oil, i.e. a mixture of α-eleostearic acid 82 wt %, linoleic acid 8 wt %, palmitic acid 5 wt %, oleic acid 5 wt % (weight percentages referred to the weight of the oil).

The polyol was TMPE 170 (trimethylolpropane ethoxylate: average number molecular weight (Mn)=170) having formula:

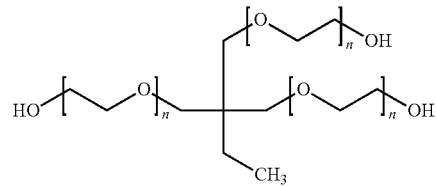

The esterification catalyst was dibutyl tin laurate (DBTL).
The amounts of the above reactants and catalyst were the following:

| | |
|---|---|
| tung oil | 84.63 wt % |
| TMPE 170 | 15.14 wt % |
| DBTL | 0.23 wt % | the wt % being expressed with respect to the total weight of the reaction mixture. The esterification reaction was carried out at a temperature of 150° C. for 12 hours.

The curable coating compositions according to the present disclosure were prepared by adding samples of the polyester obtained as described above with:

two aromatic glycidyl epoxy resins, i.e. 4,4-methylenebis(N,N-diglycidylaniline) (resin 1) and poly(bisphenol A-co-epichlorohydrin) glycidyl end-capped (resin 2);
a polyether hardener selected from polyethyleneglycol diglycidyl ether 500 (hardener 1), polyethyleneglycol diglycidyl ether 2000 (hardener 2) or hyperbranched bis-MPA-16-hydroxyl polyester (hardener 3);
piperidine as crosslinking catalyst.

The mixture was stirred at 60° C. for 3 hours.

The chemical composition of the curable coating compositions prepared as above described are reported in Table 1. The amounts are provided in wt % calculated with respect to the total weight of the curable composition.

TABLE 1

| Sample no. | Polyester | Resin 1 | Resin 2 | Hardener 1 | Hardener 2 | Hardener 3 | Catalyst |
|---|---|---|---|---|---|---|---|
| 1 | 20.49 | 22.19 | 56.27 | — | — | 0.25 | 0.80 |
| 2 | 31.36 | 18.07 | 49.67 | — | — | 0.20 | 0.70 |
| 3 | 19.38 | 13.84 | 65.52 | 0.79 | — | — | 0.47 |
| 4 | 29.98 | 18.53 | 50.48 | — | 0.29 | — | 0.72 |

For each coating composition sample, films were obtained using an automatic coater with micrometric blade set to provide film thickness from 50 to 200 μm. The films were thermally cured by heating at a temperature within the range from 220° C. to 280° C. for a curing time of 30 min in the absence of any initiator. The modulus of elasticity (E') at −30° C., +25° C. and +100° C. and the glass transition temperature (Tg—onset point) of each of the cured film as determined by means of DMTA analysis are reported in Table 2.

In Table 2, modulus and Tg of the tested compositions are compared with those of a film of a commercial secondary coating composition 3471-2-136 (by DSM). This reference material was cured by UV radiation using the curing conditions indicated by the supplier.

TABLE 2

| | E' (MPa) | | | |
|---|---|---|---|---|
| Sample | −30° C. | +25° C. | +100° C. | Tg (° C.) |
| 2 | 1439 | 902.3 | 8.888 | 39.08 |
| 3 | 2031 | 1222 | 2.611 | 39.17 |
| comparative | 1288 | 927.9 | 13.65 | 54.71 |

The results of Table 2 show that the curable coating compositions according to the present disclosure have modulus and glass transition temperature comparable to those of a marketed composition.

The invention claimed is:

1. An optical fibre comprising:
an optical waveguide comprising a glass core surrounded by a glass cladding;
a primary coating surrounding the optical waveguide;
a secondary coating, surrounding the primary coating, comprising a cured polymer material obtained by curing a curable coating composition comprising:
(a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
(b) an aromatic glycidyl epoxy resin;
(c) an aliphatic polyether hardener containing from 8 to 64 hydroxy groups and/or from 2 to 4 epoxy groups; and
(d) a secondary amine compound as curing agent.

2. The optical fibre according to claim 1, wherein the reactant A is a monocarboxylic acid.

3. The optical fibre according to claim 1, wherein the reactant A is an acid selected from: linoleic acid, linolelaidic acid, alpha-linolenic acid, arachidonic acid, eicosapentaenoic acid, alpha-eleostearic acid, calendic acid, punicic acid or licanic acid.

4. The optical fibre according to claim 1, wherein polyester (a) is present in an amount of from 15 to 35 wt % with respect to the total weight of the curable coating composition.

5. The optical fibre according to claim 1, wherein the reactant B is a polyol having from 3 to 9 hydroxyl groups.

6. The optical fibre according to claim 1, wherein the aromatic glycidyl epoxy resin (b) is an aromatic glycidyl ether resin or an aromatic glycidyl amine resin or a mixture thereof.

7. The optical fibre according to claim 6, wherein the aromatic glycidyl epoxy resin (b) comprises an aromatic glycidyl ether resin and an aromatic glycidyl amine resin in a weight ratio from 10:1 to 1:1.

8. The optical fibre according to claim 1, wherein the aromatic glycidyl epoxy resin (b) is present in an amount of from 60 to 83 wt % with respect to the total weight of the curable coating composition.

9. The optical fibre according to claim 1, wherein the aliphatic polyether hardener (c) contains from 10 to 20 hydroxy groups and/or from 2 to 4 epoxy groups.

10. The optical fibre according to claim 1, wherein the aliphatic polyether hardener (c) is a dendritic polyol polymer.

11. The optical fibre according to claim 1, wherein the aliphatic polyether hardener (c) is present in an amount of from 0.1 to 1 wt % with respect to the total weight of the curable coating composition.

12. The optical fibre according to claim 1, wherein the secondary amine compound (d) is an aliphatic secondary amine.

13. The optical fibre according to the claim 1, wherein the secondary amine compound is present in an amount of from 0.3 to 1.5 wt %, with respect to the total weight of the curable composition.

14. A process for coating an optical fibre comprising:
providing an optical waveguide comprising a glass core surrounded by a glass cladding;
forming a primary coating on the cladding;
applying a curable coating composition on the primary coating, said curable coating composition comprising:
(a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
(b) an aromatic glycidyl epoxy resin;
(c) an aliphatic polyether hardener containing from 8 to 64 hydroxy groups and/or from 2 to 4 epoxy groups; and
(d) a secondary amine compound as curing agent curing the curable coating composition so as to form a secondary coating comprising a cured polymer material.

15. The process for coating an optical fibre according to claim 14, wherein the curing of the curable composition is a thermal curing at a temperature within the range of 80° C. to 300° C.

16. A curable coating composition comprising:
(a) a polyester obtained by esterification of a reactant A selected from carboxylic acids, triglycerides, and mixtures thereof, having a $C_{16}$-$C_{24}$ aliphatic chain comprising at least two double bonds spaced by one carbon atom at most, with a reactant B selected from polyols having at least 3 hydroxyl groups, the polyols being thermally stable up to 300° C.;
(b) an aromatic glycidyl epoxy resin;
(c) an aliphatic polyether hardener containing from 8 to 64 hydroxy groups and/or from 2 to 4 epoxy groups; and
(d) a secondary amine compound as curing agent.

* * * * *

UNITED STATES PATENT AND TRADEMARK OFFICE
CERTIFICATE OF CORRECTION

PATENT NO. : 10,775,556 B2  
APPLICATION NO. : 16/572900  
DATED : September 15, 2020  
INVENTOR(S) : Lidia Terruzzi et al.

Page 1 of 1

It is certified that error appears in the above-identified patent and that said Letters Patent is hereby corrected as shown below:

On the Title Page

Item (73), the 1st Assignee's name is misspelled. Item (73) should read:  
--(73) Assignees: PRYSMIAN S.p.A., Milan, (IT);  
              POLITECNICO DI MILANO, Milan, (IT)--

Signed and Sealed this  
Tenth Day of November, 2020

Andrei Iancu  
*Director of the United States Patent and Trademark Office*